United States Patent [19]
Daage et al.

[11] Patent Number: 5,474,670
[45] Date of Patent: Dec. 12, 1995

[54] STACKED BED CATALYST SYSTEM FOR DEEP HYDRODESULFURIZATION

[75] Inventors: Michel Daage, Baton Rouge, La.; Teh C. Ho, Bridgewater, N.J.; Kenneth L. Riley, Baton Rouge, La.

[73] Assignee: Exxon Research and Engineering Company, Florham Park, N.J.

[21] Appl. No.: 245,181

[22] Filed: May 17, 1994

[51] Int. Cl.$^6$ ............ C10G 45/04; C10G 45/08
[52] U.S. Cl. .......... 208/210; 208/208 R; 208/215; 208/216 R
[58] Field of Search ............ 405/212; 206/210, 206/216 R, 215, 208 R

[56] References Cited

U.S. PATENT DOCUMENTS

| | | | |
|---|---|---|---|
| 4,279,737 | 7/1981 | Chianelli et al. | 208/217 |
| 4,419,224 | 12/1983 | Miller et al. | 208/244 |
| 4,983,558 | 1/1991 | Born et al. | 208/120 |
| 4,985,132 | 1/1991 | Moser et al. | 208/65 |
| 5,110,444 | 5/1992 | Haun et al. | 208/217 |
| 5,186,818 | 2/1993 | Daage et al. | 208/254 X |

FOREIGN PATENT DOCUMENTS

| | | |
|---|---|---|
| 867056 | 11/1978 | Belgium . |
| 700672 | 8/1977 | Japan . |
| 1601874 | 11/1981 | United Kingdom ........... C10G 45/04 |

OTHER PUBLICATIONS

"Heat Effects in Gas Sulfiding of Hydroprocessing Catalysts," Reyes and Ho, AIChE Journal, Feb. 1988, vol. 34, No. 2.

*Primary Examiner*—Helane Myers
*Attorney, Agent, or Firm*—Estelle C. Bakun

[57] ABSTRACT

The present invention relates to a method of removing sulfur from a hydrotreating process stream comprising contacting a sulfur containing feedstock with a stacked bed catalyst system comprising a first catalyst bed comprising hydrodesulfurization catalysts followed by a second catalyst bed comprising ruthenium sulfide having a surface area of at least about 30 m$^2$/g and wherein said hydrodesulfurization process is conducted at a temperature of about 150° C. to about 400° C. and a pressure of about 50 psig (344.74 kPa) to about 2500 psig (17236.89 kPa).

7 Claims, No Drawings

STACKED BED CATALYST SYSTEM FOR DEEP HYDRODESULFURIZATION

FIELD OF THE INVENTION

The present invention relates to a stacked bed or a staged bed hydrodesulfurization process which is capable of removing sulfur in the feed to very low levels.

BACKGROUND OF THE INVENTION

Transition metal sulfides (TMS) are well known catalysts that have a wide range of applications. For example, TMS catalysts are useful in hydrotreating petroleum feedstocks to remove heteroatoms in the feed, such as sulfur, oxygen and nitrogen. Such TMS catalysts can be used in hydrogenation processes, alcohol synthesis from syngas, hydrodemetallization of heavy crudes, catalytic hydrocracking and the like.

Currently, the majority of sulfur compounds in distillates are removed by conventional hydrodesulfurization (HDS) technology using conventional TMS catalysts. HDS at low hydrogen partial pressures is associated with extremely unfavorable kinetic conditions: poisoning by high levels of nitrogen, severe hydrogen starvation, and low concentrations of sulfur vacancies (catalytically active sites) on the catalysts. Hence, conventional HDS processes run at low pressures (e.g., 50–100 psig, 344.74 kPa–689.48 kPa) remove stearically hindered sulfur, also referred to as hard sulfur, at impractically slow rates, and hence require large capital outlays in order to meet emissions requirements.

Ruthenium sulfide is known to be much more active than conventional HDS catalysts. However, the catalyst is prohibitively expensive. Hence, it is surely desirable to enhance the cost effectiveness of this catalyst.

SUMMARY OF THE INVENTION

Applicants have discovered that unexpectedly deep HDS levels can be achieved by using a small amount of relatively high surface area ruthenium sulfide catalyst in a stacked or staged bed system. Specifically, the invention is capable of producing a liquid product containing at most 0.05 wt. % sulfur in diesel fuels at a sufficiently fast rate even under relatively mild conditions such as pressures as low as 50 psig (344.74 kPa). This is consistent with the Clean Air Act Amendment requirements for diesel fuels.

Hence, the present invention relates to a method of removing sulfur from a hydrodesulfurization process feed stream comprising contacting a sulfur containing feedstock with a stacked bed catalyst system comprising a first catalyst bed comprising conventional hydrodesulfurization catalysts (e.g., sulfided CoMo/Al$_2$O$_3$ or NiMo/Al$_2$O$_3$) followed by a second catalyst bed comprising ruthenium sulfide, and wherein said hydrodesulfurization process is conducted at a temperature of about 150° C. to about 400° C. and a pressure of about 50 psig (344.74 kPa) to about 2500 psig (17236.89 kPa) and wherein said ruthenium sulfide has a surface area of at least about 30 m$^2$/g, preferably at least about 50 m$^2$/g. Preferably, the pressure will be 50 psig to about 1200 psig (5515.81 kPa), more preferably 50 psig to about 800 psig (1723.69 kPa).

DETAILED DESCRIPTION OF THE INVENTION

The present invention is based on the discovery that a stacked bed catalyst system comprising conventional hydrodesulfurization catalysts followed by high surface area ruthenium sulfide catalysts is effective in removing sulfur, including stearically hindered sulfur, such as of the form

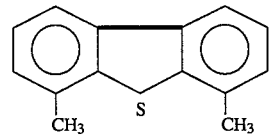

from a sulfur containing feedstock such as diesel oils. The present stacked or staged bed system synergistically achieves a much deeper HDS level than conventional HDS processes when run under the same or similar conditions.

The present process utilizes two sequential catalyst beds in series. Preferably, the beds will be contained in a single reactor (stacked), although they may be in separate reactors (staged). The first catalyst bed contains a conventional hydrodesulfurization catalyst. Any such catalyst known in the art can be used in the first bed. The term "first" as used herein refers to the first bed with which the feedstock is contacted and "second" refers to the bed with which the feedstock, after passing through the first bed, is next contacted.

The catalyst used in the second bed is high surface area ruthenium sulfide which may be utilized either in bulk or supported form. The amount of ruthenium sulfide used in the reactor, expressed as wt. % of the total catalyst, can range from as low as 0.05 to 10 wt. %, preferably 0.05 to 5 wt. %, more preferably, 0.05 to 1 wt. %. Higher amounts of RuS$_2$ could be used, but the cost would be high.

Conventional hydrodesulfurization catalysts comprise, e.g. active metal sulfide components and an inorganic refractory support, preferably an inorganic oxide. The active metal component is comprised of at least one metal from Group VIB of the Periodic Table of the Elements and at least one promoter metal, preferably a metal from Group VIII of the Periodic Table of the Elements, on an inorganic oxide support. Preferred Group VIB metals are molybdenum and tungsten. More preferred is molybdenum. Preferred Group VIII metals are selected from cobalt, nickel, and iron. More preferred are cobalt and nickel. The amounts of active metal components range from about 0.5 to 20 wt. %, preferably from about 1 to 8 wt. %, more preferably from about 2 to 5 wt. %, in terms of its oxide, based on the total weight of the catalyst for the Group VIII metal, and from about 5 to 30 wt. %, preferably from about 8 to 25 wt. %, and more preferably from about 12 to 20 wt. %, in terms of an oxide, based on the total weight of the catalyst for the Group VIB metal. Support materials suitable for use herein are any conventional support material used in the manufacture of hydrotreating catalysts. Such materials are usually refractory oxides of elements of Groups II to IV of the Periodic Table of the Elements. The Periodic Table to which all of the Groups herein referred to can be found is on the last page of *Advanced Inorganic Chemistry*, 2nd Edition, 1966, Interscience Publishers, by Cotton and Wilkinson. Preferred are alumina, silica, and silica-alumina. More preferred is alumina. The alumina may contain up to 5 wt. % of silica or phosphate to stabilize it and/or to give the desired characteristics such as pore structure and acidity. An alumina support means, therefore, one with at least 95 wt. % alumina. These conventional hydrodesulfurization catalysts, prior to use, are sulfided with a sulfur-bearing stream at elevated temperatures.

A variety of feedstocks can be hydrotreated in accordance with the present invention including both hydrocarbon fractions and whole feeds. The conditions employed when carrying out the process of the present invention will vary considerably, depending on the nature of the hydrocarbon feedstock being treated and, inter alia, the extent of conversion desired. In general, however, the following table illustrates typical conditions when utilizing commercial catalysts for hydrotreating a naphtha boiling within a range of from about 25° C. to about 210° C., a mid-distillate fuel boiling within a range of from about 170° C. to 350° C. and a heavy gas oil boiling within a range of from about 325° C. to about 475° C.

| | Hydrotreating Conditions | | | |
|---|---|---|---|---|
| Feed | Temp., °C. | Pressure psig | Space Velocity V/V/Hr. | Hydrogen Gas Rate SCF/B |
| Naphtha | 100–370 | 150–800 | 0.5–10 | 100–2000 |
| Mid-distillates | 200–400 | 250–1500 | 0.5–4 | 500–6000 |
| Heavy Gas Oil | 260–430 | 250–2500 | 0.3–2 | 1000–6000 |

The instant catalyst system, however, can be run at much less severe conditions (e.g., pressures as low as 50 psig and temperatures as low as 150° C. for mid-distillates including diesel fuels). Furthermore, the instant process can be used on any number of sulfur containing feedstocks such as naptha, mid-distillates (which include diesel oils), and heavy gas oils. It must be noted that the instant process also affords deeper HDS levels under the typical HDS conditions noted above.

The catalysts utilized in both beds of the instant process are catalysts that are known in the hydrocarbon hydroprocessing art. For example, the catalysts of the first bed can be prepared by impregnating porous alumina pellets with solution(s) containing cobalt, nickel, tungsten or molybdenum and phosphorus compound, the pellets are subsequently dried and calcined. Alternatively, one or more of the components can be incorporated into an alumina powder by mulling, the mulled powder formed into pellets and calcined at elevated temperatures. Combinations of impregnating and mulling can also be used. Other suitable methods can be found in the prior art (See e.g., A. B. Stiles, "Catalyst Manufacture," Marcel Dekker Inc., 1983). These catalysts are then normally sulfided prior to use. Typically, the catalysts are sulfided by heating in an $H_2S/H_2$ atmosphere at elevated temperatures. For example, a suitable presulfiding procedure comprises heating the catalysts in hydrogen sulfide/hydrogen atmosphere (10 V% $H_2S$/90 V% $H_2$) for about two hours at about 370° C. Other methods (See e.g., H. Hallie, Oil Gas Journal, 69, Dec. 1982) are also suitable for sulfiding and generally comprise heating the catalysts to elevated temperatures (e.g., 200°–400° C.) in the presence of hydrogen and a sulfur containing material. In particular, the conventional catalyst used in the present nonlimiting examples, was KF-752 supplied by AKZO chemicals. KF-752 contains about 5 wt. % CoO and 20 wt. % $MoO_3$ on alumina. Presulfiding of this catalyst was carried out with 10 V % $H_2S$ in $H_2$ at 360° C. for 3 hours.

The $RuS_2$ catalyst of the second catalyst bed can be prepared in accordance with the following procedure.

Bulk $RuS_2$ may be prepared by sulfiding $(NH_4)_2 RuCl_6$ with pure $H_2S$ at a relatively moderate temperature for a prolonged period of time. This ensures that the final $RuS_2$ product has a high surface area (~60 $m^2/g$). The sulfiding temperature was raised from 25° C. to 325° C. over an 8 hour period. The catalyst was then cooled to room temperature and maintained in the sulfiding oven overnight. Next, under pure $H_2S$, the catalyst was heated from room temperature to 350° C. over a 6 hour period and kept at 350° C. for 2 hours. The catalyst was then cooled to room temperature under nitrogen.

The evaluation experiments were conducted in a fixed-bed reactor immersed in a sand bath. The reactor was packed with about 10 cc of catalyst(s) in the central zone and denstone in the fore and aft zones. To ensure an adequate reactor-to-particle diameter ratio, the catalysts were crushed into 14/35 mesh granules. To obtain the lined-out activity, the reaction under a particular set of conditions was allowed to proceed for at least 24 hours before the first product sample was analyzed. The liquid product was analyzed for total sulfur by X-ray fluorescence and for nitrogen by combustion analysis.

The above prepared bulk $RuS_2$ may be supported by any techniques known in the art.

The activity results were obtained with a light catalytic cycle oil. Its properties are listed in Table 1, One can see that in order to achieve the 0.05 wt. % specification, the HDS level must at least be 96.6%. This means that some of the severely hindered DBTs (e.g., 4,6-dimethyldibenzothiophene, or 4,6-DBT for short) must be removed.

TABLE 1

| Feedstock Inspection | |
|---|---|
| API | 10.9 |
| S, wt % | 1.47 |
| N, ppm | 557 |
| H, wt % | 8.6 |
| GCD Distillation | |
| 1/5 | 327/451 |
| 10/20 | 467/496 |
| 30/40 | 571/532 |
| 50/60 | 551/575 |
| 70/80 | 601/633 |
| 90/95 | 666/686 |
| 99 | 730 |
| DBT, wt % | 21.21 |
| 4 methyl-DBT | 14.60 |
| 4,6-DBT | 4.77 |
| Total DBT | 40.58 |
| DBT, S, wt % | 0.3097 |
| 4 methyl-DBT | 0.2131 |
| 4,6-DBT | 0.0697 |

Three experimental runs were made. Stacked bed A comprises 0.6 cc of the $RuS_2$ catalyst downstream of 5.4 cc of the KF-752 catalyst. Stacked B comprises 0.6 cc of $RuS_2$ catalyst upstream of 5.4 cc of the KF-752 catalyst. As a base case, the KF-752 catalyst was evaluated in a single-catalyst bed. Reaction conditions were 650° F. (346° C.), 330 psig (2275.3 kPa), and 2000 SCF/BBL $H_2$. The liquid hourly space velocity (LHSV) was varied between 0.51 and 0.85.

The results are shown in the following examples. The following examples are for illustration and are not meant to be limiting.

EXAMPLE 1

The HDS data obtained for the KF-752 catalyst are summarized in Table 2.

TABLE 2

HDS in Single-Catalyst Beds, KF-752

| LHSV | Hr on Oil | % HDS |
|---|---|---|
| 0.85 | 181 | 93.88 |
|  | 202.5 | 94.56 |
|  | 224.8 | 94.29 |
|  | 248.6 | 94.56 |
|  | 275.6 | 94.63 |
|  | 302.0 | 94.49 |
|  | 325.1 | 94.49 |
| 0.52 | 404.7 | 97.07 |
|  | 428.8 | 97.07 |
|  | 453.3 | 97.01 |
|  | 475.1 | 97.07 |
|  | 495.9 | 97.07 |
|  | 522.7 | 97.01 |

As can be seen, at an LHSV=0.85, the catalyst failed to achieve the 96.6% HDS target.

EXAMPLE 2

TABLE 3

Table 3 summarizes the results obtained from stacked bed A.
HDS in Stacked Bed A

| LHSV | Hr on Oil | % HDS |
|---|---|---|
| 0.85 | 202.5 | 97.21 |
|  | 224.8 | 97.14 |
|  | 248.6 | 97.21 |
|  | 275.6 | 97.35 |
|  | 302.0 | 97.21 |
|  | 325.1 | 97.28 |
| 0.52 | 379.2 | 98.64 |
|  | 404.7 | 98.64 |
|  | 428.8 | 98.64 |
|  | 453.3 | 98.71 |
|  | 475.1 | 98.84 |
|  | 495.9 | 98.91 |
|  | 522.7 | 98.98 |

EXAMPLE 3

TABLE 4

Table 4 summarizes the results obtained from stacked bed B.
HDS in Stacked Bed B

| LHSV | Hr on Oil | % HDS |
|---|---|---|
| 0.85 | 181.0 | 94.35 |
|  | 202.5 | 95.24 |
|  | 224.8 | 95.24 |
|  | 248.6 | 95.31 |

The results shown in the tables clearly show that the overall HDS level depends strongly on the stacking order. The two constituent catalysts interact with each other in a nonlinear fashion.

Note that a small difference in percent HDS in the deep HDS regime translates into a big difference in terms of reactor size for a given HDS level. It is thus of paramount importance to develop kinetics for deep HDS. This is discussed below.

In analyzing HDS kinetic data, the hydrogen concentration term is customarily incorporated in the rate constant because hydrogen is present in large excess. Experiments using single-component feeds have indicated that when an organosulfur species desulfurizes in the absence of any other sulfur species, the reaction rate is pseudo-first order [M. J. Grgis and B. C. Gates, Ind. Eng. Res., 30, 2021 (1991) and references therein]. When the feed is a mixture of many sulfur species, the individual HDS rate is described by Langmuir-Hinshelwood kinetics because of competitive adsorption. The overall, or lumped kinetics for removal of total sulfur can be viewed as the sum of a large number of individual HDS reactions of widely different rates.

Since the number of reacting species in the petroleum feedstocks is very large, the feed mixture can be practically treated as a continuum. An important outcome of the continuum approach is the development of asymptotic kinetics IT. C. Ho, B. S. White, and R. Hu, AIChE J., 36, 685 (1990) and T. C. Ho, Chem. Eng. Sci., 46, 281 (1991)] in the high-conversion regime, or deep HDS in the present context. It turns out that for many classes of reaction kinetics (power-law, Langmuir-Hinshelwood, bimolecular, etc.), there appears to be a universal "law" under many practically important conditions; that is, the lumped kinetics take a power-law form asymptotically [for a few exceptions, see T. C. Ho, B. S. White, and R. Hu, AIChE J., 36, 685 (1990)].

To be specific, at high HDS levels, the fractional sulfur remaining, $C=S_p/S_f$ ($S_p$ and $S_f$ are wt. % of sulfur in the product and feed, respectively), is given by the simple equation (1).

$$C \sim \frac{\sigma}{(1/LHSV)^z} \quad (1)$$

where $\sigma$ and $z$ can be determined a priori if the reactivities and concentrations of the hard sulfur species are known. Equation (1) implies the following lumped kinetics for deep HDS:

$$\frac{dC}{d(1/LHSV)} \sim -z\sigma^{-1/z} C^n, n = 1 + \frac{1}{z} > 1 \quad (2)$$

That is to say, deep HDS is governed by an nth-order kinetics, with $n=1+1/z$. The value of z can be determined from the slope of the plot ln c vs. ln (1/LHSV). Based on the data in Tables 2 and 3, it was found that the values of z (and hence n) are slightly different for different catalyst beds, but n=1.7 provides an acceptable representation in all cases. Thus, the 1.7-order rate constant can be used as a measure of the overall catalyst HDS activity or the overall performance of the stacked bed. This rate constant, denoted by k, is calculated by:

$$k = \frac{LHSV}{0.7 S_f^{0.7}} \left[ \left( \frac{S_f}{S_p} \right)^{0.7} - 1 \right] \quad (3)$$

Table A summarizes the performances of the single-catalyst and stacked beds based on Equation (3).

TABLE A

Comparison of Single-Catalyst and Stacked Beds

| Catalyst Bed | k |
|---|---|
| KF-752 | 6.0 |
| Stacked Bed A | 11.0 |
| Stacked Bed B | 6.7 |

As can be seen, stacked bed A outperformed stacked bed B by a factor 11.0/6.7=1.64. Clearly, the preferred configuration is to place the commercial catalyst upstream of the $RuS_2$ catalyst. This configuration gives rise to an activity synergy.

What is claimed is:

1. A hydrodesulfurization process for producing a low sulfur content liquid product comprising contacting a sulfur containing feedstock with a stacked bed catalyst system comprising a first catalyst bed comprising a hydrodesulfufization catalyst, followed by a second catalyst bed comprising a ruthenium sulfide catalyst, at a temperature of about 150° C. to about 400° C. and a pressure of about 50 psig (344.74 kPa) to about 2500 psig (17236.89 kPa), wherein said ruthenium sulfide catalyst has a surface area of at least about 30 m$^2$/g and wherein said hydrodesulfurization catalyst of said first catalyst bed is comprised of an active metal sulfide component and an inorganic refractory oxide, said active metal of said active metal sulfide selected from the group consisting of at least one Group VI B metal and at least one promoter metal and wherein said inorganic refractory oxide is selected from the group consisting of refractory oxides of elements of Groups II to IV of the Periodic Table.

2. A process according to claim I wherein said feedstock is selected from the group consisting of naphtha, mid-distillates, diesel oils, and heavy gas oils.

3. A process according to claim 1 wherein said hydrodesulfurization process yields a liquid product containing at most 0.05 wt. % sulfur when said feedstock is a diesel oil.

4. A process according to claim 1 wherein said hydrodesulfurization catalysts are selected from the group consisting of sulfided cobalt molybdenum and sulfided nickel molybdenum on a refractory oxide support and mixtures thereof.

5. A process according to claim 1 wherein said ruthenium sulfide catalyst has a surface area of at least about 50 m$^2$/g.

6. A process according to claim 4 wherein said refractory oxide support is selected from the group consisting of alumina, silica, silica-alumina and mixtures thereof.

7. A process according to claim 1 wherein said promoter metal is selected from the group consisting of Group VIII metals.

* * * * *